United States Patent [19]

Castel

[11] Patent Number: 5,201,571
[45] Date of Patent: Apr. 13, 1993

[54] BEARING PIECE FOR A SUSPENSION ELEMENT

[75] Inventor: Philippe Castel, Paris, France

[73] Assignee: Bendix Europe Services Techniques, Drancy, France

[21] Appl. No.: 832,672

[22] Filed: Feb. 6, 1992

Related U.S. Application Data

[63] Continuation of Ser. No. 557,270, Jul. 25, 1990, abandoned.

[30] Foreign Application Priority Data

Aug. 31, 1989 [FR] France .................. 89 11410

[51] Int. Cl.⁵ .............................. B60G 7/00
[52] U.S. Cl. ....................... 303/22.5; 303/9.69; 303/22.8; 188/195
[58] Field of Search ............. 303/9.69, 22.5, 22.8; 188/195, 280; 267/217, 220

[56] References Cited

U.S. PATENT DOCUMENTS

| | | | |
|---|---|---|---|
| 4,302,058 | 11/1981 | Nagase et al. | 303/22.5 |
| 4,629,257 | 12/1986 | Carre et al. | 303/22.5 |
| 4,773,712 | 9/1988 | Maggioni et al. | 303/22.5 |
| 4,824,180 | 4/1989 | Levrai | 303/22.5 |
| 4,828,329 | 5/1989 | Schonlau et al. | 303/9.69 |
| 4,925,251 | 5/1990 | Picot et al. | 303/9.69 |

FOREIGN PATENT DOCUMENTS

| | | |
|---|---|---|
| 0283328 | 9/1988 | European Pat. Off. . |
| 2739362 | 3/1979 | Fed. Rep. of Germany ..... 303/22.5 |
| 3224295 | 12/1983 | Fed. Rep. of Germany ..... 303/22.8 |
| 2136933 | 12/1972 | France . |
| 2164115 | 7/1978 | France . |
| 2608540 | 6/1988 | France . |
| 1317539 | 5/1973 | United Kingdom . |
| 2199098 | 6/1988 | United Kingdom . |

*Primary Examiner*—Matthew C. Graham
*Attorney, Agent, or Firm*—Larry J. Palguta; Ken C. Decker

[57] ABSTRACT

A bearing piece for a suspension unit of a motor vehicle, acting as a pressure sensor for a fluid-controlled brake regulator and intended to be mounted between a suspension element (12, 14) and a part of the vehicle by way of an elastic bearing (16) or, a pivoting mounting, has a piston mechanism (20) which can move counter to the pressure prevailing in a leaktight chamber (24). A mechanism (30, 34, 36, 40, 42) is provided so that the pressure in the leaktight chamber (24) is greater than a predetermined pressure.

19 Claims, 3 Drawing Sheets

BEARING PIECE FOR A SUSPENSION ELEMENT

This is a continuation of abandoned application Ser. No. 07/557,270 filed Jul. 25, 1990, now abandoned.

BACKGROUND OF THE INVENTION

The present invention relates to a bearing piece for a suspension element for a motor vehicle, acting as a pressure sensor for a fluid-controlled brake regulator.

Fluid-controlled brake regulators operated by the suspension of a vehicle are known. Patent GB-B-1,542,507, for example, describes, a system of this type. For satisfactory operation of these regulators, the pressure sensor must be simple, reliable and easy to install in the vehicle. U.S. Pat. No. 4,824,180 describes a sensor of this type having an annular pressure chamber receiving an annular piston which is displaced as a function of the force perceived by the bearing cup of the suspension spring.

U.S. Pat. No. 4,828,329 provides a device integrating a regulator arranged between the turns of the suspension spring and having a closed pressure chamber coaxial with the device. However, this device is extremely complex and therefore expensive and, in the event of escape of the fluid enclosed in the chamber, the regulator behaves in a manner which may be prejudicial to safety.

Although being entirely satisfactory, these known sensors only give information on the suspension spring load and are in particular ineffective for measuring the load on the wheel of a vehicle with trim correction, in particular integrated with the shock absorber.

In addition, these known pressure sensors all have another disadvantage. They have a leaktight chamber in which the hydraulic pressure is a function of the load supported by the suspension element, this element being formed from the suspension spring and/or from the shock absorber. When the vehicle goes over a protuberance in the road, the pressure in the leaktight chamber increases rapidly and then decreases rapidly, corresponding to the moment when the load is removed from the wheels. If the height of the protuberance is great and/or if the speed of the vehicle is high, the wheels may then momentarily leave the ground. The suspension element then works in traction, and the relative pressure in the leaktight chamber may be cancelled out and even become negative, which can be prejudicial on the one hand to the diaphragm closing the leaktight chamber and on the other hand to the operation of the brake regulator which is combined with it.

SUMMARY OF THE INVENTION

The object of the present invention is to overcome these disadvantages. The subject of the invention is therefore a bearing piece for a suspension element of a motor vehicle, acting as a pressure sensor for a fluid-controlled brake regulator and intended to be mounted between a suspension element and a part of the vehicle by means of an elastic bearing or a pivoting mounting, and having a piston means which can move counter to the pressure prevailing in a leaktight chamber.

According to the invention, there are provided means so that the pressure in the leaktight chamber is greater than a predetermined pressure.

According to a first embodiment of the invention, these means consist of the application of an overpressure to the fluid contained in the leaktight chamber. This overpressure may be obtained by using stressed rubber or by a compression spring.

According to a second embodiment of the invention, these means consist of a stop limiting the stroke of the piston means.

BRIEF DESCRIPTION OF THE DRAWINGS

The invention will be better understood and other objects, advantages and features of it will emerge more clearly upon reading the description which follows of preferred embodiments, given in a non-limiting way, with references to the drawings in which.

In the different figures, identical components are referenced by the same numeral.

DETAILED DESCRIPTION OF THE INVENTION

Figure 1:
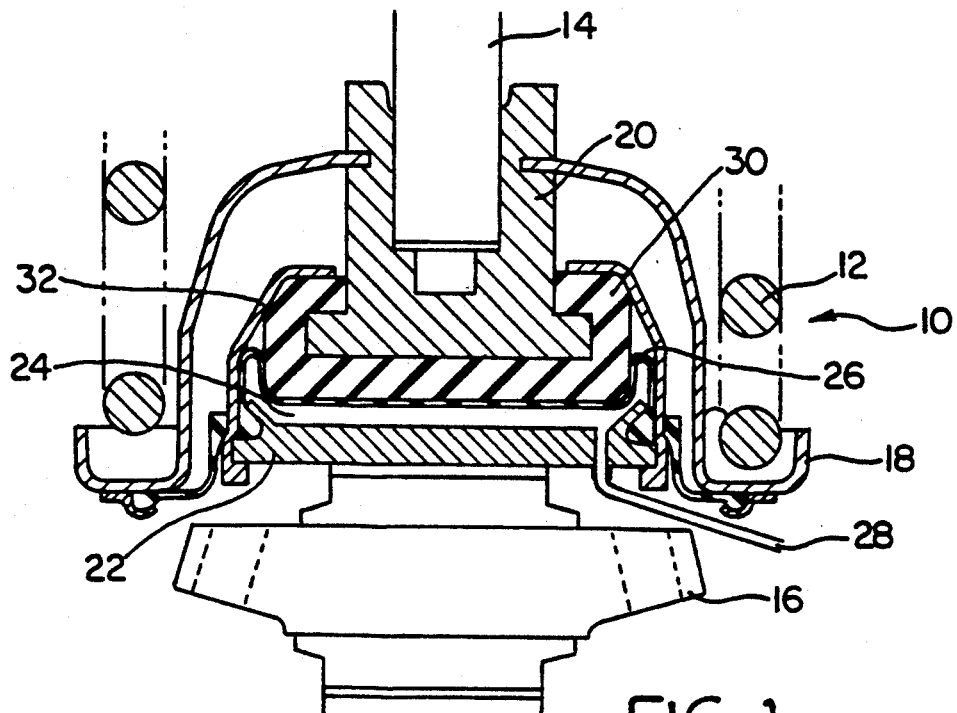
FIG. 1 shows a diagrammatic cross-section of a first embodiment of a bearing piece according to the invention.

With reference to FIG. 1, a bearing piece 10 has been shown inserted between the end of a suspension unit consisting, in this example, of a suspension spring 12 and of a shock absorber 14 and a "silent block" or elastic bearing 16. The suspension spring 12 bears against the periphery of a cup 18. This cup 18 is integral with a piston 20, itself integral with the end of the shock absorber 14. The piston 20 establishes, with the base 22 of the bearing piece, a leaktight chamber 24 by means of a rolling diaphragm 26, the peripheral edge of which is crimped onto the base 22. The leaktight chamber 24 is connected by a duct 28 to the control chamber of a fluid-controlled brake regulator (not shown in the figures).

The pressure of the hydraulic fluid contained in the chamber 24 is therefore representative of the load of the suspension unit 12, 14, and therefore of the wheel associated with this suspension unit. It can thus be seen that, when the suspension unit is subjected to traction forces, the pressure in the chamber 24 may be cancelled out and cavitation phenomena may appear, harming both the rolling of the diaphragm 26 and the operation of the brake regulator connected to the duct 28.

According to the invention, there is provided a threshold below which the pressure in the chamber 24 cannot fall, this threshold being obtained by pre-tensioning applied to the fluid in the chamber 24.

According to the embodiment in FIG. 1, the head of the piston 20 is surrounded by a layer of elastic material such as rubber 30. A cup 32 is fastened onto the base 22, for example by screwing, and bears against the head of the piston 20 on the side opposite to that which forms the chamber 24. The rubber is thus stressed, and transmits this stress to the fluid located in the chamber 24, even when the suspension unit 12,14 works in traction relative to the elastic bearing 16. When the load on the wheel, and therefore on the associated suspension unit, resumes its initial value, the diaphragm 26 occupies its normal position and causes no danger of folds forming.

Figure 2:
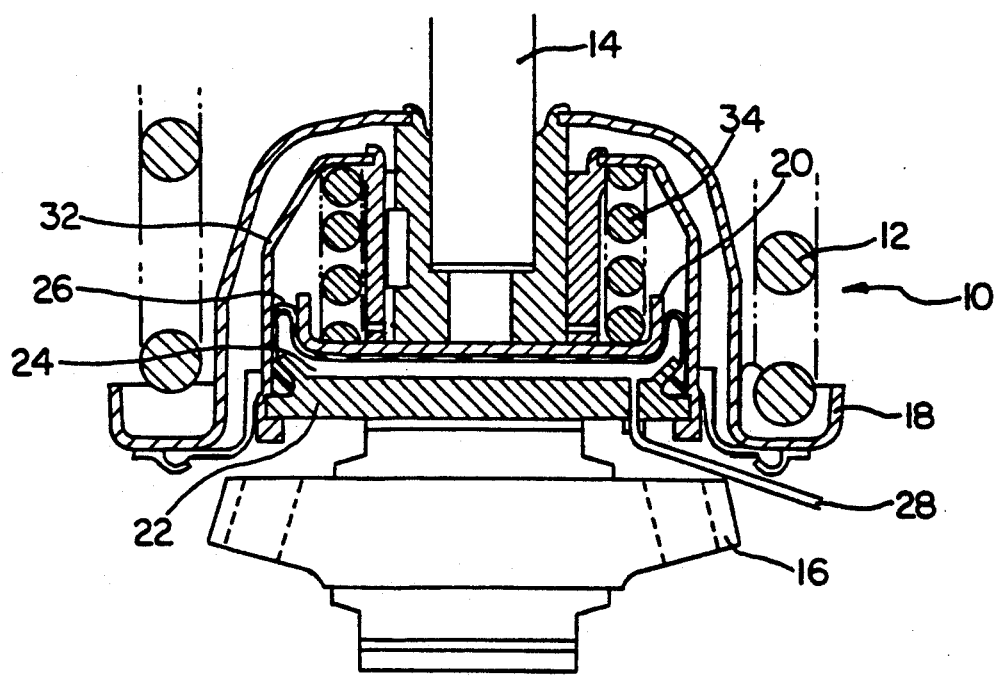
FIG. 2 shows a diagrammatic cross-section of a second embodiment of a bearing piece according to the invention.

According to the embodiment in FIG. 2, the prestressing is applied to the fluid contained in the chamber 24 by a spring 34 which is compressed between the cup 32 and the piston 20.

Figure 3:
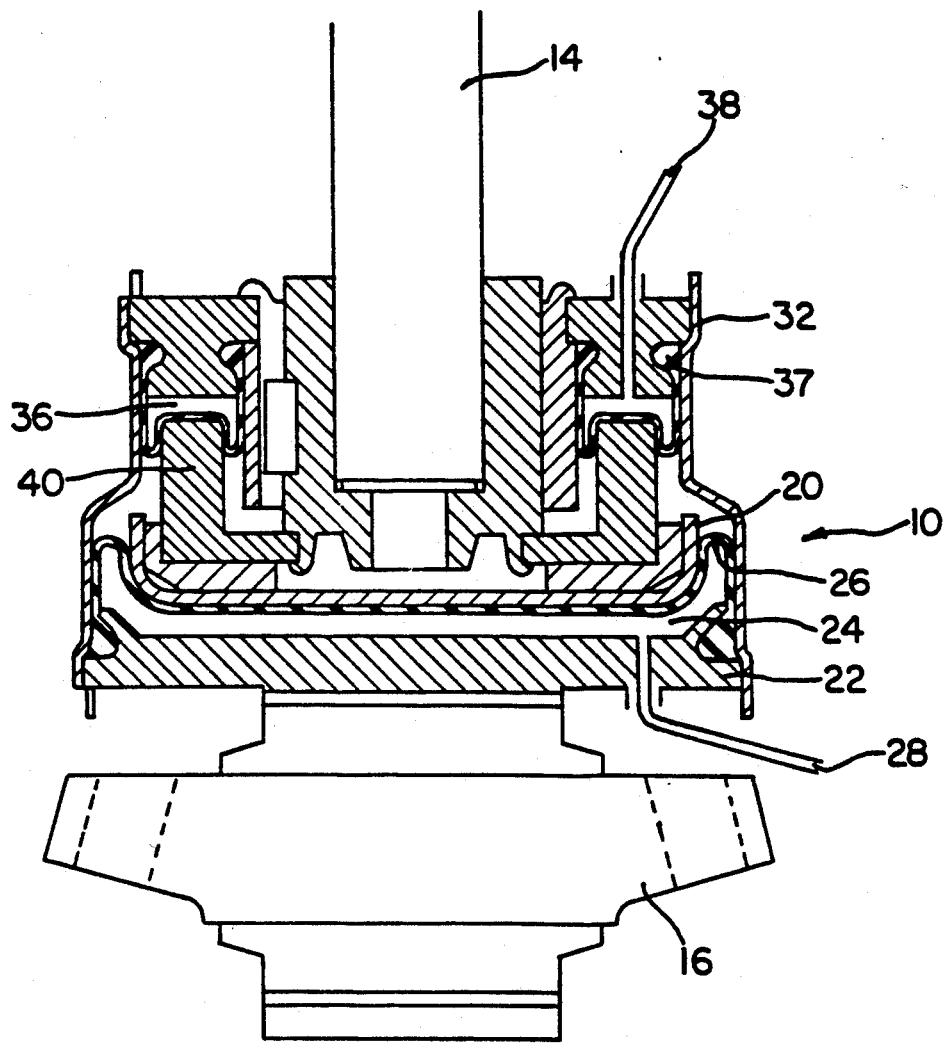
FIG. 3 shows a diagrammatic cross-section of a third embodiment of a bearing piece according to the invention.

According to the embodiment in FIG. 3, the prestressing applied to the fluid in the chamber 24 is obtained by the pressurization of a fluid in another leaktight chamber. This pressure may be kept constant by any known means or, as a variant, may be the pressure of the fluid contained in the leaktight chamber of another bearing piece acting as a pressure sensor. It will be possible to apply this variant, in the case of vehicles in which the shock absorber 14 is not housed inside the suspension spring, in order to give the information on the total load on the wheel. According to the embodiment in FIG. 3, the cup 32 is equipped on its inner wall opposite the piston 20 with an annular leaktight chamber 36 connected by a lead 38 to a source of pressurized hydraulic fluid and closed by an annular diaphragm 37, whereas the piston 20 is equipped, on the face opposite to that which establishes the chamber 24, with an annular piece 40 interacting with the chamber 36. The pressure prevailing in the annular chamber 36 is thus transmitted to the piston 20 with the result that the chamber 24 cannot have a low pressure. An annular chamber 36 and annular reaction piece 40 system of this type may, of course, be used in the embodiments in FIGS. 1 and 2 to replace the rubber part 30 or the spring 34. Advantageously, the chamber 36 may be connected to another bearing piece subjected to the load of a suspension spring and the pressure in the chamber 24 will then be representative of the total load of the associated wheel.

Figure 5:
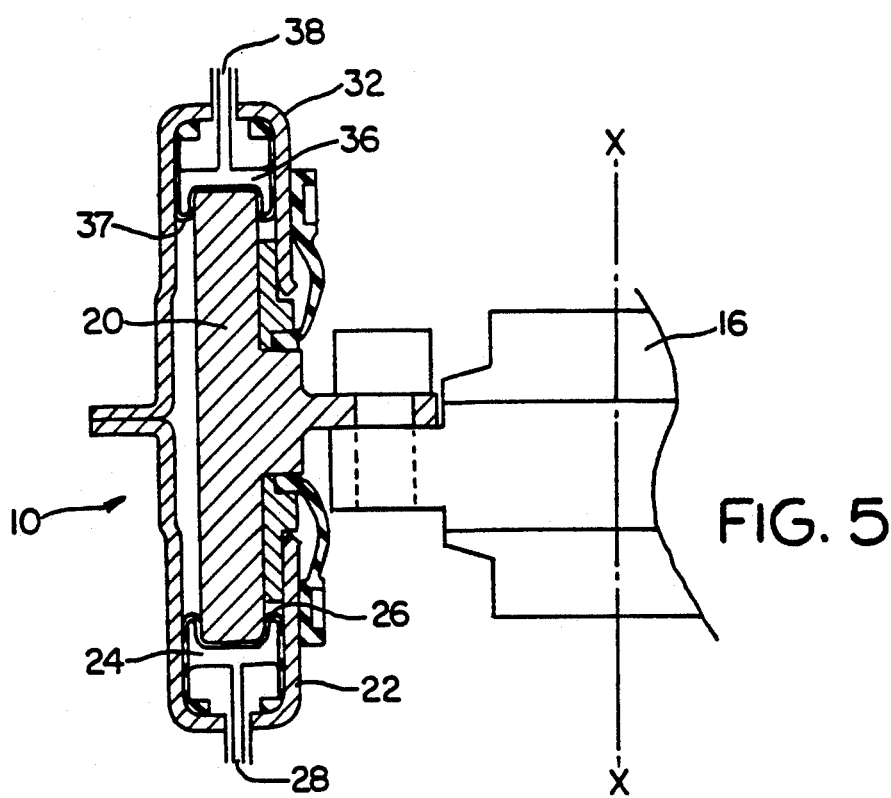
FIG. 5 shows a diagrammatic cross-section of a variant of the embodiment in FIG. 3.

FIG. 5 shows a variant of the embodiment in FIG. 3, according to which the shock absorber (not shown in this FIG. 5) is connected, by means of the elastic bearing 16, to the piston 20 which, in this example, is annular along the axis X—X. The piston 20 establishes, with the base 22 of the bearing piece, a leaktight chamber 24 by means of a diaphragm 26 which, in this variant, is annular. The cup 32, also annular in this variant, is equipped on its inner wall opposite the piston 20 with an annular leaktight chamber 36 connected by a lead 38 to a source of pressurized hydraulic fluid and closed by a diaphragm 37, and the rear face of the piston 20 itself forms the annular piece 40 co-operating with the chamber 36 so that the pressure in this chamber 24 cannot fall below a predetermined value. As in the other embodiments, the base 22 is fastened to a vehicle part which consists either of a suspension arm or of the chassis. Advantageously, it will be possible to provide for the annular diaphragms 26 and 37 to be identical.

Figure 4:
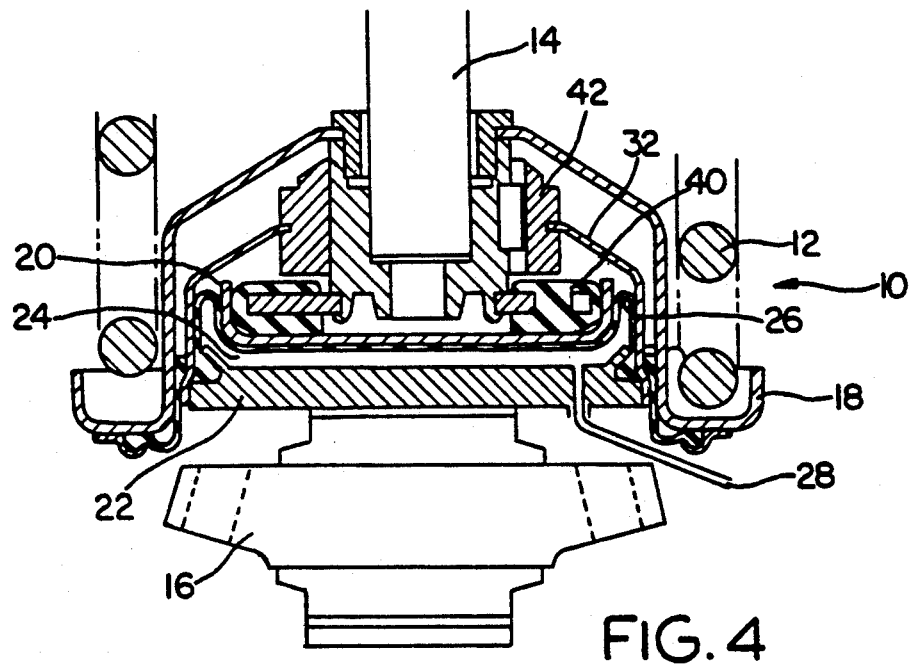
FIG. 4 shows a diagrammatic cross-section of a fourth embodiment of a bearing piece according to the invention.

FIG. 4 shows another embodiment in which the face of the piston 20 opposite to that which establishes the chamber 24 is lined with rubber 40, whereas the cup 32 is integral with a stop 42 limiting the stroke of the piston 20 when the suspension unit works in traction. A compression spring could be arranged between the cup 32 and the lining 40.

With the embodiments described, a bearing piece is obtained for a suspension element forming a pressure sensor for a brake regulator, the reliability of which is ensured whatever the operating conditions and which gives the desired load information.

Although some preferred embodiments of the invention have been described, it is evident that it will be possible for numerous modifications to be made by a person skilled in the art without going beyond the scope of the invention. For example, the "silent block" or elastic bearing has been shown between the bearing piece and the chassis, but could be mounted between the foot of the shock absorber and the bearing piece. Similarly, a pivoting mounting can be used in place of the elastic bearing and, finally, the bearing piece can be arranged at the upper attachment of the shock absorber, between the shock absorber and the chassis, or at the lower attachment, between the shock absorber and the suspension arm.

What we claim is:

1. A suspension unit of a motor vehicle, the suspension unit including a pressure sensor for a fluid-controlled brake regulator and a bearing piece mounted between a suspension element and a part of the vehicle by means of an elastic bearing, the sensor comprising piston means which moves counter to pressure prevailing in an adjacent leaktight chamber, and pressure means for effecting a minimum threshold pressure in the leaktight chamber so that a negative pressure cannot occur in said leaktight chamber, the threshold pressure being an overpressure of fluid contained in the leaktight chamber and created by the pressure means which includes a layer of elastic material connected with the piston means and engaging a diaphragm of said leaktight chamber, and the elastic material prestressed against the diaphragm by the bearing piece which is a stationary cap engaging the elastic material.

2. The suspension unit according to claim 1, wherein the suspension element is a suspension spring.

3. The suspension unit according to claim 1, wherein the suspension element is a shock absorber.

4. The suspension unit according to claim 1, wherein the suspension element consists of a suspension spring arranged around a shock absorber.

5. The suspension unit according to claim 1, wherein the part of the vehicle consists of a chassis of the vehicle.

6. A suspension unit of a motor vehicle, the suspension unit including a pressure sensor for a fluid-controlled brake regulator and a part of the vehicle by means of an elastic bearing, the sensor comprising piston means which moves counter to pressure prevailing in an adjacent leaktight chamber, and pressure means for effecting a minimum threshold pressure in the leaktight chamber so that a negative pressure cannot occur in said leaktight chamber, the threshold pressure being an overpressure of fluid contained in the leaktight chamber and created by the pressure means which includes a spring arranged between the piston means and the bearing piece which is a stationary cup, the spring biasing the piston means against a diaphragm of said leaktight chamber.

7. The suspension unit according to claim 6, wherein the suspension element is a suspension spring.

8. The suspension unit according to claim 6, wherein the suspension element is a shock absorber.

9. The suspension unit according to claim 6, wherein the suspension element consists of a suspension spring arranged around a shock absorber.

10. The suspension unit according to claim 6, wherein the part of the vehicle consists of a chassis of the vehicle.

11. A suspension unit of a motor vehicle, the suspension unit including a pressure sensor for a fluid-controlled brake regulator and a bearing piece mounted by one of between a suspension element and a part of the vehicle by means of an elastic bearing and connected with the suspension element by way of the elastic bearing and a pivoting mounting, the sensor comprising piston means which moves counter to pressure prevailing in an adjacent first leaktight chamber, and pressure means for effecting a minimum threshold pressure in the first leaktight chamber so that a negative pressure cannot occur in said first leaktight chamber, the threshold pressure being an overpressure of fluid contained in the first leaktight chamber and created by the pressure means which includes a second leaktight chamber having a prevailing pressure, the second leaktight chamber contained within the bearing piece and engaging and biasing said piston means against a diaphragm of the first leaktight chamber.

12. The suspension unit according to claim 11, wherein the second leaktight chamber is subjected to pressure generated by a second pressure sensor.

13. The suspension unit according to claim 11, wherein the suspension element is a shock absorber.

14. The suspension unit according to claim 11, wherein the part of the vehicle consists of a suspension arm of the vehicle.

15. The suspension unit according to claim 11 wherein the part of the vehicle consists of a chassis of the vehicle.

16. A suspension unit of a motor vehicle, the suspension unit including a pressure sensor for a fluid-controlled brake regulator and a bearing piece mounted between a suspension element and a part of the vehicle by means of an elastic bearing, the sensor comprising piston means which moves counter to pressure prevailing in an adjacent leaktight chamber and against a diaphragm of said chamber, and pressure means for effecting a minimum threshold pressure in the leaktight chamber so that a negative pressure cannot occur in said leaktight chamber, wherein the pressure means consists of a stop connected with the bearing piece and limiting a stroke of the piston means so that the piston can move only a predetermined distance away from said leaktight chamber.

17. The suspension unit according to claim 16, wherein the suspension element is a suspension spring.

18. The suspension unit according to claim 16, wherein the suspension element is a shock absorber.

19. The suspension unit according to claim 16, wherein the part of the vehicle consists of a chassis of the vehicle.

* * * * *